United States Patent [19]

Nakamura et al.

[11] Patent Number: 5,280,363
[45] Date of Patent: Jan. 18, 1994

[54] SLIT CAMERA APPARATUS

[75] Inventors: Takashi Nakamura; Shinji Kusuura, both of Kanagawa; Masahiro Kawakami, Tokyo; Yoshikazu Nishimura, Kanagawa, all of Japan

[73] Assignee: Sony Corporation, Tokyo, Japan

[21] Appl. No.: 868,560

[22] Filed: Apr. 14, 1992

[30] Foreign Application Priority Data

Apr. 19, 1991 [JP] Japan ............................. 3-088750

[51] Int. Cl.⁵ .......................................... H04N 5/76
[52] U.S. Cl. ................................. 358/335; 346/107 B
[58] Field of Search ..................... 358/335, 906, 909; 346/107 A, 107 B

[56] References Cited

U.S. PATENT DOCUMENTS

| | | | |
|---|---|---|---|
| 4,523,204 | 6/1985 | Bovay | 346/107 B |
| 4,752,764 | 6/1988 | Peterson et al. | 340/323 R |
| 4,797,751 | 1/1989 | Yamaguchi | 358/335 |
| 5,103,433 | 4/1992 | Imhof | 368/9 |
| 5,105,395 | 4/1992 | Imhof | 368/9 |

Primary Examiner—Michael T. Razavi
Assistant Examiner—Joseph Colaianni
Attorney, Agent, or Firm—Philip M. Shaw, Jr.

[57] ABSTRACT

Image signals of moving subjects which are imaged by a slit camera, and time information generated by a time information generator after it has been reset by a start trigger signal, are successively stored in and erased from a large-storage-capacity memory on a first-in, first-out basis. After elapse of a predetermined time period after a record trigger signal has been supplied from a record trigger generator, a storage time control circuit controls the memory to stop storing and erasing the image signals and the time information, and keeps the image signals and the time information stored which have been stored before the memory stops storing and erasing the image signals and the time information. The image information of the subjects and the time information associated with the image information can be stored in the memory within a storage time that depends on the storage capacity of the memory.

3 Claims, 4 Drawing Sheets

SLIT CAMERA APPARATUS

BACKGROUND OF THE INVENTION

1. Field of the Invention

The present invention relates to a slit camera apparatus for use as an apparatus for indicating the order of arrival of competitors at a goal, for example.

2. Description of the Prior Art

Slit cameras are heretofore used as apparatus for indicating the order of arrival of competitors at a goal. For example, in a horse race track, a slit camera having a slit extending parallel to a goal post is used to determine the order of the horses that arrive at the goal, in the event that the order cannot be judged directly by eyes.

Conventional slit cameras include a photographic slit camera employing a silver halide film and a slit camera apparatus including a line sensor as disclosed in Japanese laid-open patent publication No. 2-84977.

The slit camera apparatus disclosed in the above publication comprises a slit camera employing a line sensor and an endless electronic display board. The slit camera is fixed in position such that its slit extends in a direction perpendicular to the direction (plane) in which subjects move, and the direction of the slit coincides with the longitudinal direction of the line sensor. The direction of the slit is perpendicular to the transverse direction of the line sensor.

In use, data produced by the line sensor and the display position on the electronic display board are synchronized with each other for displaying the order of arrival of the moving subjects at the goal on the electronic display board.

Slit camera apparatus as apparatus for indicating the order of arrival of competitors or moving subjects at a goal require that the order of arrival of the moving subjects be accurately determined based on the displayed images of the moving subjects, and also that the displayed images be accompanied by time information indicating the times at which the moving objects are photographed by the slit camera. To meet the above requirements, it is necessary to store, in a memory, image information of areas where the objects pass through the goal and also time information corresponding to the image information.

The amount of image information that can be stored in a memory is determined by the storage capacity of the memory. Generally, the cost and other factors of the memory prevent a large amount of image information, i.e., image information spanning a long period of time, from being stored in the memory.

OBJECTS AND SUMMARY OF THE INVENTION

In view of the above drawbacks of the conventional slit camera apparatus, it is an object of the present invention to provide a slit camera apparatus capable of storing, in a memory, image information of subjects and time information corresponding to the image information when the subjects are imaged, within a storage time that is determined by the storage capacity of the memory.

According to the present invention, there is provided a slit camera apparatus comprising a start trigger generator for generating a start trigger signal, time information generating means, resettable by the start trigger signal generated by the start trigger generator, for starting a measuring time to generate time information, a slit camera having a slit, for producing image signals indicative of image information borne by light having passed through the slit, memory means for successively storing, as pairs, the image signals produced by the slit camera and the time information generated by the time information generating means, and for successively and automatically storing and erasing image signals and time information on a first-in, first-out basis when the image signals and the time information are supplied in excess of a storage capacity of the memory means, a record trigger generator for generating a record trigger signal, and storage time control means for controlling the memory means to stop storing and erasing newly generated image signals and the time information after elapse of a first predetermined time period after the record trigger signal is supplied from the record trigger generator, and for keeping the image signals and the time information stored in the memory means from a second predetermined time period beginning prior to the supply of the record trigger signal to the storage time control means.

Specifically, the storage time control means comprises means controls the memory means to store image signals and time information within a predetermined storage time which stretches across the time when the record trigger signal is generated by the record trigger generator.

The time information generating means is reset by the start trigger signal from the start trigger generator. The image signals from the slit camera, and the time information generated by the time information generating means after it has been reset are successively stored in and erased from the memory means on a first-in, first-out basis. After elapse of the predetermined time period after the record trigger signal has been supplied from the record trigger generator, the storage time control means controls the memory means to stop storing and erasing the image signals and the time information, and keeps the image signals and the time information stored which have been stored before the memory means stops storing and erasing the image signals and the time information. The image information of subjects to be imaged and the time information associated with the image information can be stored in the memory means within a storage time that depends on the storage capacity of the memory means.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 1:
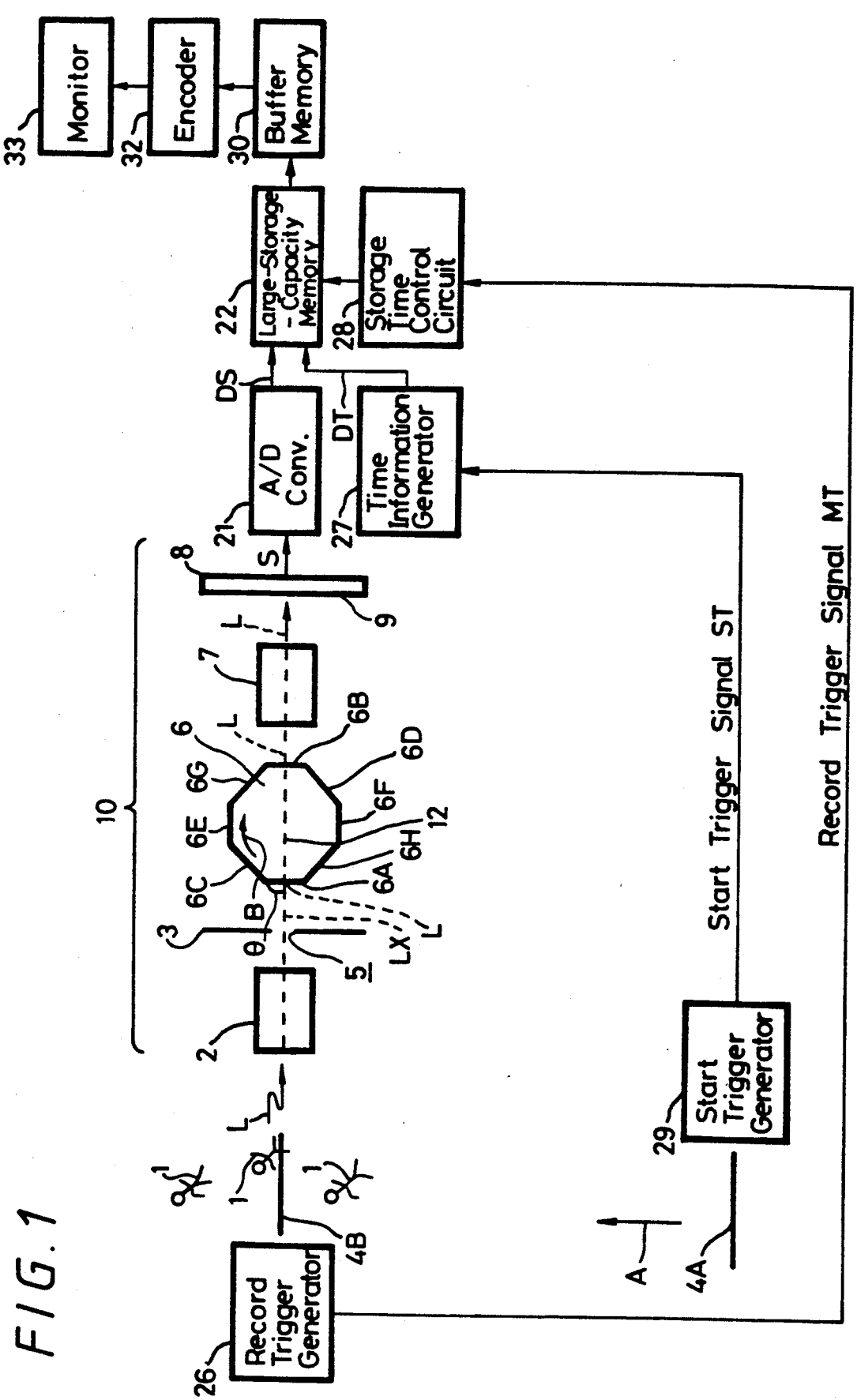
FIG. 1 is a block diagram of a slit camera apparatus according to the present invention.

As shown in FIG. 1, a slit camera apparatus according to the present invention has a slit camera 10 which is shown in plan in FIG. 1. Subjects 1 such as competitors move in the direction indicated by the arrow A from a start line 4A to a goal line 4B. Light L, which bears image information of the subjects 1, is converged by a first lens 2 and passes through a slit 5 in a slit member 3. The light L as it passes through the slit 5 is focused at the position of the slit 5. The slit 5 extends perpendicularly to the direction A in which the subjects 1 move.

The light L that has passed through the slit 5 is applied as linear light L to a prism 6 that rotates about a shaft 12 (see also FIG. 2) in the direction indicated by the arrow B. The rotating prism 6 has eight facets 6A through 6H, and is in the form of a regular octagonal prism which has an octagonal cross section as viewed along the shaft 12. The rotating prism 6 may comprise any prism insofar as it has parallel diametrically opposite facets. Therefore, the rotating prism 6 may be a prism having an even number of four or more facets, such as a quadrangular prism, a hexagonal prism, or the like.

The linear light L that has been applied to one of the facets of the rotating prism 6 passes through the rotating prism 6, and then leaves the rotating prism 6. If the incident angle θ of the linear light L is not 90°, then the linear light L changes its direction in the rotating prism 6. The first lens 2 and the slit member 3 are positioned relatively to each other such that the linear light L applied to the rotating prism 6 has an optical axis LX whose extension extends perpendicularly to the shaft 12 of the rotating prism 6, and also that the extension of the optical axis LX lies in line with the goal line 4B.

The linear light L that emerges from the rotating prism 6 is converged again by a second lens 7 which comprises a relay lens, and focused on a photoelectric conversion surface 9 of an area sensor 8 which may comprise a CCD area sensor or the like. The photoelectric conversion surface 9 has a two-dimensional matrix of pixels which lies perpendicularly to a horizontal direction, each of the pixels having a photoelectric conversion capability. The horizontal direction H corresponds to the direction of horizontal scanning lines in a standard television system. In this embodiment, the area sensor 8 is angularly displaced 90° so that the horizontal direction is aligned with the longitudinal direction of the slit 5 in the slit member 3, for maintaining a desired vertical resolution for the subjects 1.

Figure 2:
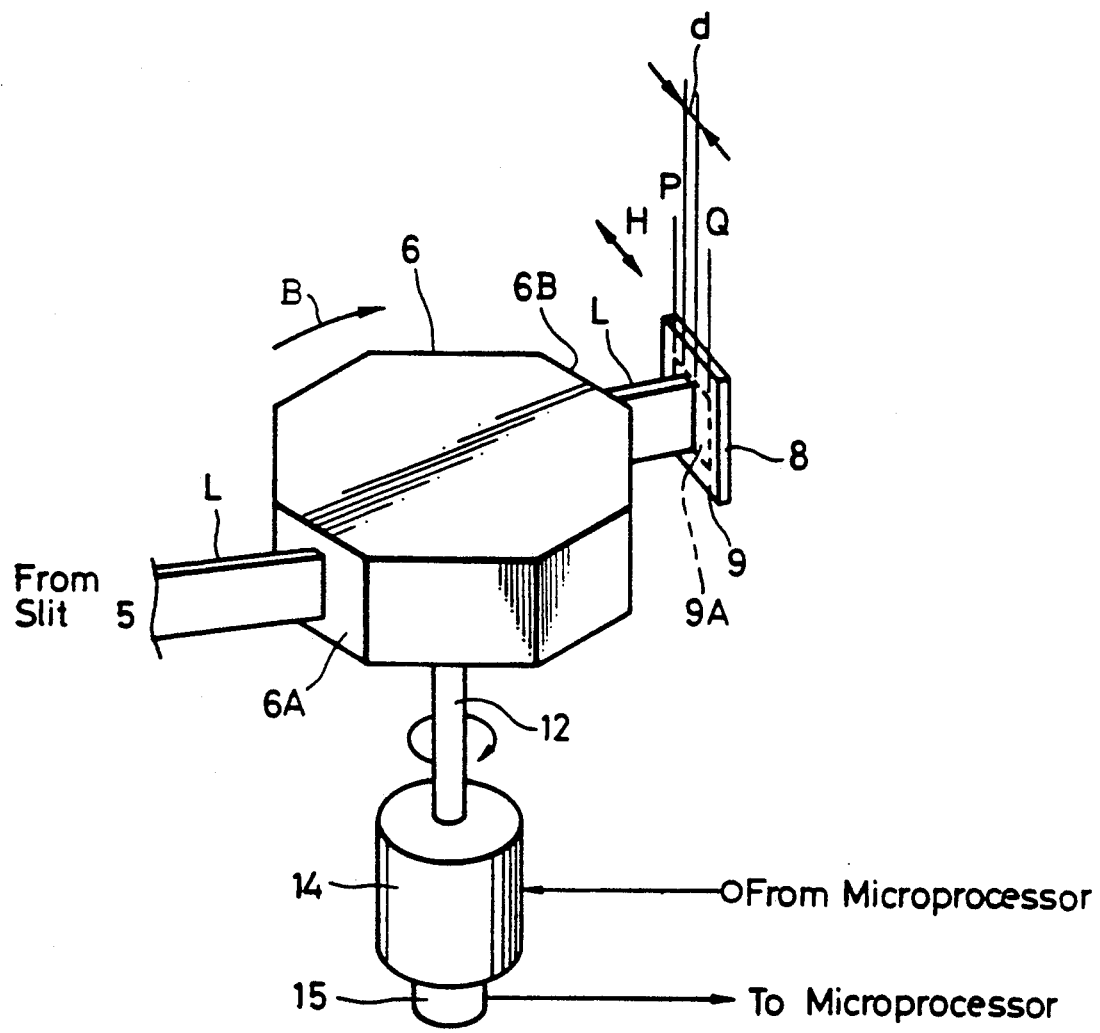
FIG. 2 is a fragmentary perspective view showing the manner in which the photoelectric conversion surface of an area sensor is scanned by a rotating prism to form a two-dimensional image on the area sensor in the slit camera apparatus.

The linear light L which has left, and hence has been deflected by, the rotating prism 6 scans the photoelectric conversion surface 9 of the area sensor 8. The manner in which the photoelectric conversion surface 9 is scanned by the deflected linear light L from the rotating prism 6 is shown in FIG. 2. The second lens 7 is omitted from illustration in FIG. 2. As shown in FIG. 2, the rotating prism 6 is rotated by a motor 14 through the shaft 12. The motor 14 is associated with an encoder 15 which produces an output signal indicative of the rotational speed of the motor 14. The rotational speed of the motor 14 is controlled in a servo loop by a microprocessor (not shown) which is supplied with the output signal from the encoder 15.

A two-dimensional image according to the linear light L is formed in a scanned area 9A that is swept by the linear light L on the photoelectric conversion surface 9. It can be understood that an image formed in the scanned area 9A by the linear light L deflected by one of the facets, e.g., the facet 6B, of the rotating prism 6 when the linear light L scans the area 9A in one cycle, i.e., from a point P to a point Q) is an image that may correspond to one vertical period in the standard television system. During a period of time which corresponds to such one vertical period, the two-dimensional image is stored in the photoelectric conversion surface 9. The stored two-dimensional image can then be read once in one vertical period as an image signal S (see FIG. 1) indicative of two-dimensional image information in the standard television system. The frequency in one vertical period is not limited to the frequency according to the standard NTSC format. In this embodiment, the frequency in one vertical period is lower than the standard NTSC frequency.

The image signal S from the area sensor 8 is read in the standard television system by a read signal from a controller (not shown). The read image signal S is then converted into a digital image signal DS by an A/D converter 21, and the digital image signal DS is stored in a large-storage-capacity memory 22.

The stored image in the scanned area 9A is read in a horizontal direction H (see FIG. 2) in each of successive pixel widths which corresponds to a linear image interval d on the photoelectric conversion surface 9 of the area sensor 8.

Figure 3:
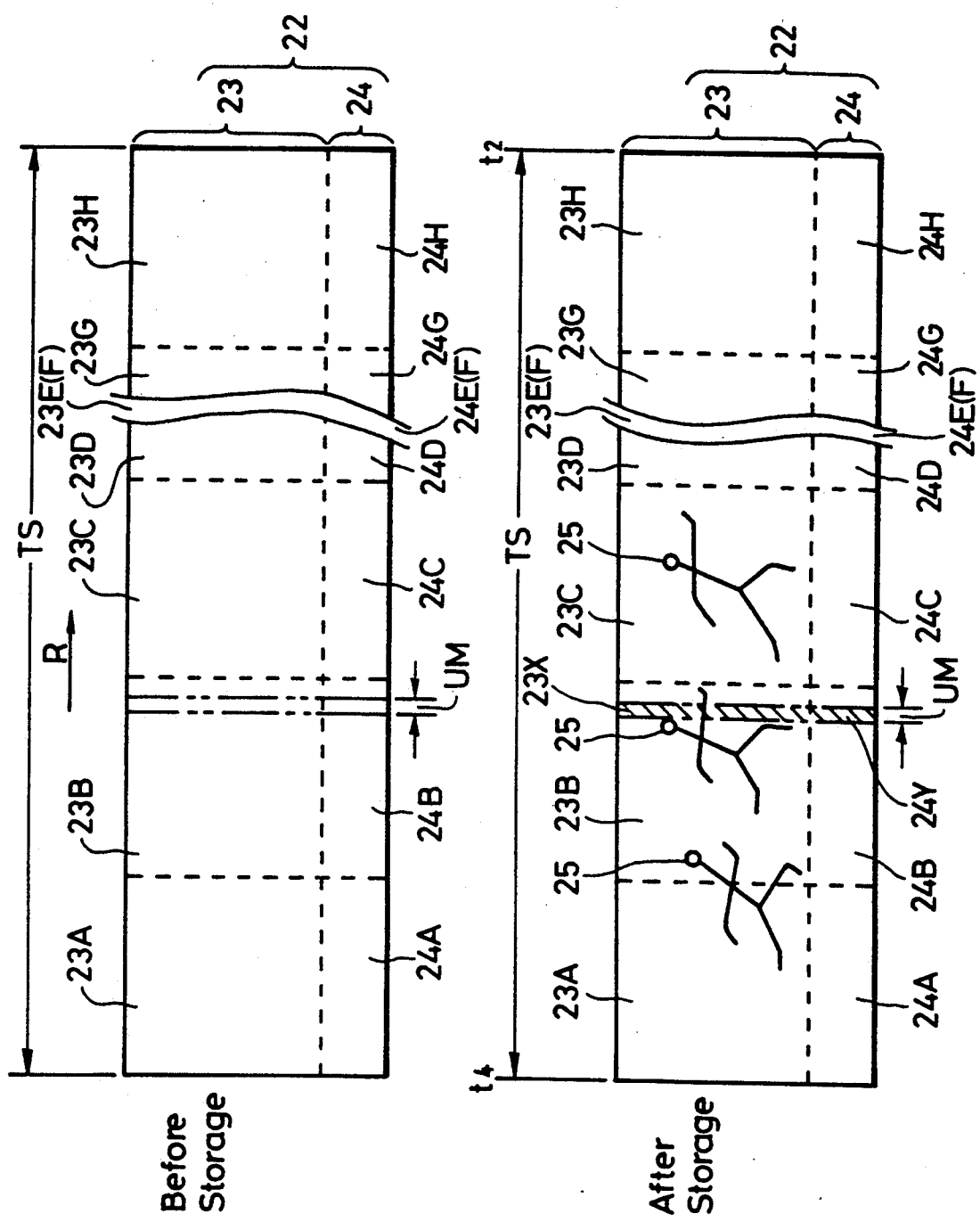
FIG. 3A is a diagram of a large-storage-capacity memory of the slit camera apparatus.
FIG. 3B is a diagram showing image and time information stored in the large-storage-capacity memory shown in FIG. 3A.

As shown in FIG. 3A, the large-storage-capacity memory 22 comprises an image memory area 23 and a time memory area 24. The image memory area 23 is composed of eight image memory areas 23A through 23H for successively storing digital image signals DS indicative of two-dimensional images corresponding to eight consecutive vertical periods. The time memory area 24 is composed of eight time memory areas 24A through 24H for successively storing items of time information DT represented by digital time signals corresponding to the digital image signals DS stored in the respective image memory subareas 23A through 23H. The time interval spanned by the data that can be stored in the large-storage-capacity memory 22 is determined by the storage capacity of the memory 22, and is represented as a storage time Ts in FIG. 3A.

Each of the digital image signals DS is stored as image signal elements corresponding to the linear image intervals d, in successive unit memory areas UM (each corresponding to a pixel width).

The process of storing or writing the digital image signals DS is controlled by a start trigger generator 29 (see FIG. 1) positioned in alignment with the start line 4A, a record trigger generator 26, which may comprise a light sensor or the like, positioned in alignment with the goal line 4B, a time information generator 27 for producing the time information DT in the form of digital time signals, and a storage time control circuit 28 for controlling the storage time of data to be stored in the large-storage-capacity memory 22.

Figure 4:
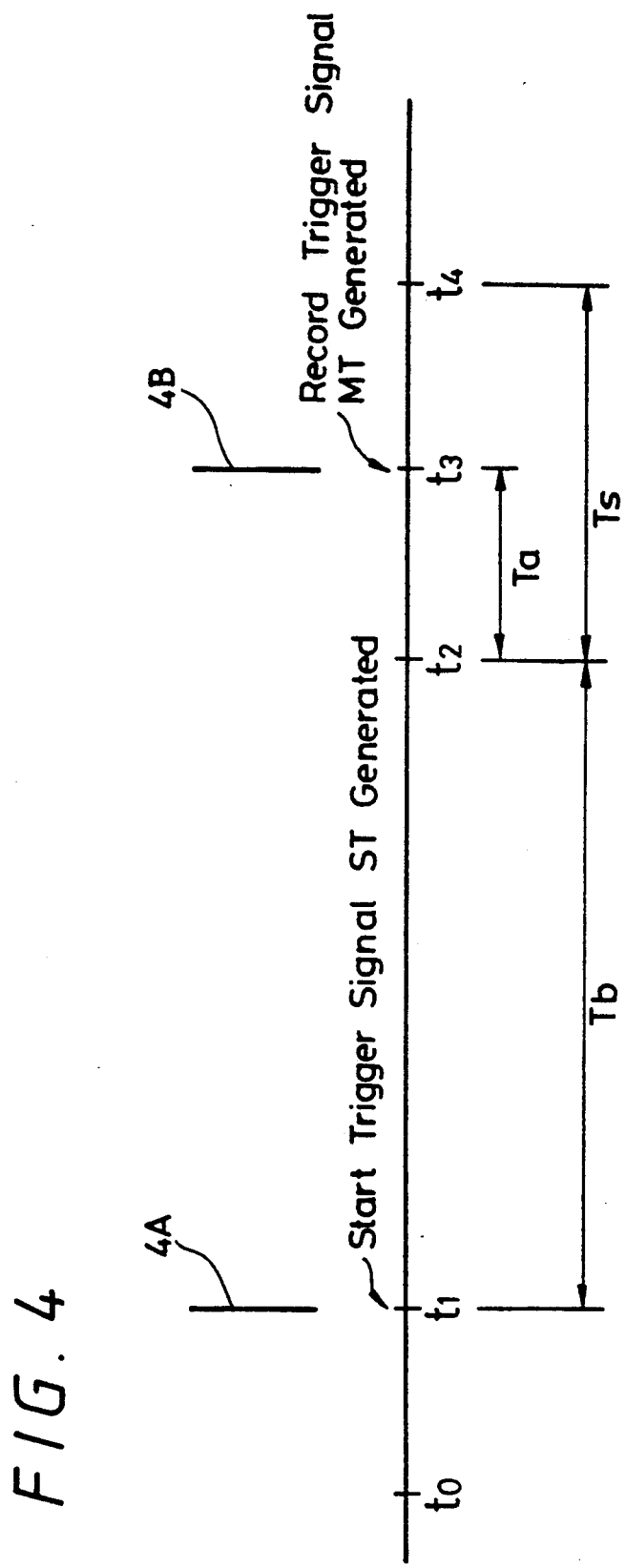
FIG. 4 is a diagram illustrative of a process of controlling the storage of image signals and corresponding time information within a storage time, with the slit camera apparatus shown in FIG. 1.

The process of storing or writing the digital image signals DS will be described below with reference to FIG. 4.

At a time t0 prior to a start time t1, the data that has been stored in the large-storage-capacity memory 22 is erased, and digital image signals DS from the slit camera 10 and time information DT from the time information generator 27 are successively stored as pairs in the large-storage-capacity memory 22. At this time, the digital image signals DS from the slit camera 10 and the time information DT from the time information generator 27 are stored as successive data pairs. If digital image signals DS and time information DT are supplied in excess of the storage capacity of the memory 22, then they are stored and some of the stored data are erased on a first-in, first-out basis.

More specifically, as shown in FIG. 3A, the digital image signals DS and the time information DT are supplied to successive unit memory areas UM of the image and time information memory areas 23A, 24A, respectively, in the direction indicated by the arrow R. When the digital image signals DS and the time information DT are supplied, those digital image signals DS and the time information DT which have already been stored in the large-storage-capacity memory 22 are transferred through the successive unit memory areas UM in the direction R. Those digital image signals DS and the time information DT which overflow the image and time information memory areas 23H, 24H are erased from one unit memory area UM at a time. Therefore, the large-storage-capacity memory 22 successively store digital image signals DS and the time information DT during the storage time Ts.

Then, at the start time t1, a start trigger signal ST is generated in synchronism with a start signal by the start trigger generator 29, which also serves as a start signal generator, and is supplied to the time information generator 27. The time information generator 27 resets any measured time to zero in response to the arrival of the start trigger signal ST, and then starts measuring time.

When the subjects 1 that have started moving with the start signal pass the record trigger generator 26 at the goal line 4B, the record trigger generator 26 supplies a record trigger signal MT to the storage time control circuit 28. The record trigger generator 26 may be positioned forwardly or rearwardly of the goal line 4B, rather than in alignment with the goal line 4B. The storage time control circuit 28 has already been set to a certain time Ta (see FIG. 4) prior to a goal time t3 when it is supplied with the record trigger signal MT. The storage time control circuit 28 controls the large-storage-capacity memory 22 to store digital image signals DS and time information DT from a time t2 when the time Ta starts to a time t4 when the storage time Ts elapses. After the time t4, the storage time control circuit 28 controls the large-storage-capacity memory 22 to prevent the stored data from being rewritten or modified.

Therefore, the large-storage-capacity memory 22 is capable of storing digital image signals DS and time information DT during a time interval in which the subjects 1 pass the goal line 4B, i e., during the storage time Ts from the time t2 to the time t4. Consequently, the large-storage-capacity memory 22 is not required to have a storage capacity corresponding to a storage time from the start time t1 to the goal time t3.

A digital image signal DS, which corresponds to a linear image width d, from the A/D converter 21 is stored in an image memory area 23X, shown hatched, in a unit memory area UM (see FIG. 3B), and a digital time signal indicative of time information DT corresponding to the digital image signal DS is stored in a time memory area 24Y, also shown hatched, in the unit memory area UM in synchronism with the digital image signal DS. These two digital image and time signals DS, DT are therefore paired when stored in the large-storage-capacity memory 22. The digital image signal DS is composed of pixel data representing an image 25 of a subject 1.

The digital image signals DS and the time information DT stored in the large-storage-capacity memory 22 are compressed as pairs, and transferred to a buffer memory 30 (see FIG. 1). The digital image signals accompanied by the time information, which have been transferred to and stored in the buffer memory 30, are encoded by an encoder 32, from which they are outputted as a composite video signal. The composite video signal from the encoder 32 is displayed as a still image on a display monitor 33. When the displayed still image on the display monitor 33 is observed, the order of arrival of the subjects 1 at the goal line 4B can accurately be determined. The time information at the time the subjects 1 are imaged by the slit camera 10 is also displayed along with the image. Therefore, the times that the respective subjects 1 took to reach the goal line 4B from the start line 4A can also be known.

In this embodiment, the generation of the record trigger signal MT allows the storage time Ts to be adjusted to a time period that stretches across the goal time t3 when the subjects 1 pass the goal line 4B, so that image information produced around the times when the subjects 1 pass the goal line 4B can suitably be stored within the storage time Ts that depends on the storage capacity of the large-storage-capacity memory 22.

If the times that the subjects 1 require to move from the start line 4A to the goal line 4B are known, or the storage time Ts is relatively long, then the time information generator 27 may have a timer, and the timer may control the memory 22 to start storing the necessary image and time information after elapse of a predetermined time period Tb (see FIG. 4) subsequent to the start trigger signal ST. If such a timer is employed, the record trigger generator 26 may be dispensed with.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A slit camera apparatus comprising:
   a start trigger generator for generating a start trigger signal;
   time information generating means, resettable by the start trigger signal generated by the start trigger generator, for starting a measuring time to generate time information;
   a slit camera having a slit, for producing image signals indicative of image information borne by light having passed through the slit;
   memory means for successively storing, as pairs, the image signals produced by the slit camera and the time information generated by the time information generating means, and for successively and automatically storing and erasing image signals and time information on a first-in, first-out basis when the image signals and the time information are supplied in excess of a storage capacity of the memory means;

a record trigger generator for generating a record trigger signal; and storage time control means for controlling the memory means to stop storing and erasing newly generated image signals and the time information after the elapse of a first predetermined time period after the record trigger signal is supplied from the record trigger generator to the storage time control means, and for keeping the image signals and the time information stored in the memory means from a second predetermined time period beginning prior to the supply of the record trigger signal to the storage time control means.

2. A slit camera apparatus according to claim 1, wherein the storage time control means comprises means for controlling the memory means to store image signals and time information within a predetermined storage time which stretches across the time when the record trigger signal is generated by the record trigger generator.

3. A slit camera apparatus according to claim 1, wherein the slit camera comprises:
 a slit member having the slit therein, the slit being aligned perpendicular to the direction of a subject to be photographed by the slit camera;
 a rotating prism;
 a photoelectric sensor;
 first lens means for focusing the light bearing the image information from the subject through the slit onto the prism and light exiting from the prism onto the photoelectric sensor, whereby the light exiting from the rotating prism is scanned across the photoelectric sensor;
 analog to digital converting means supplied with an analog output from the photoelectric sensor for producing the image signal as a digital video signal corresponding to an image of the subject observed by the camera through the slit.

* * * * *